United States Patent [19]
Woollenweber et al.

[11] Patent Number: 5,787,711
[45] Date of Patent: Aug. 4, 1998

[54] MOTOR-ASSISTED TURBO-COOLING SYSTEM FOR INTERNAL COMBUSTION ENGINES

[75] Inventors: William E. Woollenweber, Carlsbad; Edward M. Halimi, Montecito, both of Calif.

[73] Assignee: Turbodyne Systems, Inc., Carpinteria, Calif.

[21] Appl. No.: 713,112

[22] Filed: Sep. 16, 1996

[51] Int. Cl.$^6$ ..................................................... F01P 5/08
[52] U.S. Cl. .......................... 60/597; 123/41.12; 417/407
[58] Field of Search .................. 60/597, 607, 608, 60/599; 417/407, 406, 408, 409; 123/41.12

[56] References Cited

U.S. PATENT DOCUMENTS

| | | |
|---|---|---|
| 2,078,499 | 4/1937 | Ljungstrom . |
| 2,173,489 | 9/1939 | Voigt . |
| 2,492,672 | 12/1949 | Wood ..................................... 417/407 |
| 2,578,785 | 12/1951 | Davis . |
| 2,649,048 | 8/1953 | Pezzillo et al. . |
| 2,782,721 | 2/1957 | White . |
| 2,829,286 | 4/1958 | Britz . |
| 3,163,790 | 12/1964 | White . |
| 3,557,549 | 1/1971 | Webster . |
| 3,572,982 | 3/1971 | Kozdon . |
| 3,961,199 | 6/1976 | Bronicki . |
| 4,445,337 | 5/1984 | McCreary . |
| 4,453,381 | 6/1984 | Dinger . |
| 4,565,505 | 1/1986 | Woollenweber . |
| 4,641,977 | 2/1987 | Woollenweber . |
| 4,708,095 | 11/1987 | Luterek . |
| 4,708,602 | 11/1987 | McEachern, Jr. et al. . |
| 4,776,168 | 10/1988 | Woollenweber . |
| 4,827,170 | 5/1989 | Kawamura et al. . |
| 4,850,193 | 7/1989 | Kawamura . |
| 4,878,347 | 11/1989 | Kawamura . |
| 4,882,905 | 11/1989 | Kawamura . |
| 4,885,911 | 12/1989 | Woollenweber et al. .............. 60/597 |
| 4,894,991 | 1/1990 | Kawamura . |

(List continued on next page.)

FOREIGN PATENT DOCUMENTS

| | | |
|---|---|---|
| 295985 | 12/1988 | European Pat. Off. . |
| 367406 | 5/1990 | European Pat. Off. . |
| 2479899 | 10/1981 | France . |
| 3539782 | 5/1987 | Germany ............................ 60/608 |
| 57-212331 | 12/1982 | Japan . |
| 58-222919 | 12/1983 | Japan . |
| 59-49323 | 3/1984 | Japan . |
| 3202633 | 9/1991 | Japan . |
| 4-112921 | 4/1992 | Japan . |
| 5-5419 | 1/1993 | Japan . |
| 267149 | 8/1927 | United Kingdom . |
| 308585 | 3/1929 | United Kingdom . |

OTHER PUBLICATIONS

SAE Technical Paper 940842 "Turbo–Compound Cooling Systems for Heavy–Duty Diesel Engines", 1994, W.E. Woollenweber.

Proc. Instn. Mech Engrs. vol. 189, 43/75, "Experimental and Theoretical Performance of a Radial Flow Turbocharger Compressor with Inlet Prewhirl", 1975, pp. 177–186, F.J. Wallace, et al.

"Turbo–Compound Cooling Systems for Heavy–Duty Diesel Engines", SAE Technical Paper Series No. 940842, International Congress & Exposition, Feb. 28–Mar. 3, 1994.

*Primary Examiner*—Michael Koczo
*Attorney, Agent, or Firm*—Brinks Hofer Gilson & Lione

[57] ABSTRACT

An internal combustion engine cooling system incorporating a motor-assisted turbofan is disclosed. The turbine-driven fan is increased in rotational speed by energizing a motor attached to the turbine fan shaft from an outside power source to provide required cooling air flow. The cooling air system of the invention also includes a ducted fan for supplying cooling air for one or more heat exchangers, and is controlled via inputs from an engine speed sensor for providing a motor operating signal, a flow sensor downstream of the heat exchangers for providing a motor operating signal, and temperature sensors located throughout the cooling circuits.

13 Claims, 4 Drawing Sheets

U.S. PATENT DOCUMENTS

| | | |
|---|---|---|
| 4,901,530 | 2/1990 | Kawamura . |
| 4,918,923 | 4/1990 | Woollenweber et al. .................. 60/597 |
| 4,935,656 | 6/1990 | Kawamura . |
| 4,955,199 | 9/1990 | Kawamura . |
| 4,958,497 | 9/1990 | Kawamura . |
| 4,958,708 | 9/1990 | Kawamura . |
| 4,981,017 | 1/1991 | Hara et al. . |
| 4,998,951 | 3/1991 | Kawamura . |
| 5,025,629 | 6/1991 | Woollenweber . |
| 5,038,566 | 8/1991 | Hara . |
| 5,074,115 | 12/1991 | Kawamura . |
| 5,088,286 | 2/1992 | Muraji . |
| 5,094,587 | 3/1992 | Woollenweber . |
| 5,121,605 | 6/1992 | Oda et al. ................................. 60/608 |
| 5,168,706 | 12/1992 | Kawamura ................................. 60/608 |
| 5,176,509 | 1/1993 | Schmider et al. . |
| 5,406,979 | 4/1995 | Kawamura . |
| 5,560,208 | 10/1996 | Halimi et al. . |
| 5,605,045 | 2/1997 | Halimi et al. . |

MOTOR-ASSISTED TURBO-COOLING SYSTEM FOR INTERNAL COMBUSTION ENGINES

FIELD OF THE INVENTION

This invention relates to cooling systems for internal combustion engines, and particularly for internal combustion engine systems with a plurality of heat exchangers. More particularly, this invention relates to turbo-cooling systems and to motor-assisted turbocoolers and turbo-cooling systems.

BACKGROUND OF THE INVENTION

The cooling load on modern, heavy-duty diesel engines has forced the cooling system components to become larger, more complex, and more expensive. The diesel engine and auxiliary equipment used to power many types of off-highway equipment, such as farm machinery and earth movers, require the use of as many as five separate heat exchangers, such as an engine coolant heat exchanger, charge air cooler, hydraulic oil cooler, engine lube oil cooler, and often an air-conditioning condenser.

Current practice is to mount all these heat exchangers in a series-parallel arrangement in front of the engine where ambient air is drawn through them by an engine-driven fan. The flow resistance of these heat exchangers and the high total heat rejection has necessitated the use of fans of higher flow and pressure capability which increases the parasitic power absorbed by the fan from the engine.

The feasibility of the design of turbine-driven fan systems has been investigated in W.E. Woollenweber's doctoral dissertation, entitled *The Thermodynamic Basis For The Design Of Turbine-Driven Fan Systems To Provide Cooling Air For Engine And Vehicle Heat Exchangers*, 1993, on file in the California Coast University Library. A condensation of this investigation has been published in SAE Paper No. 940842, entitled *Turbo-Compound Cooling Systems For Heavy-Duty Diesel Engines*, by W. E. Woollenweber. Basic systems for cooling with turbine-driven fans have been described in U.S. Pat. No. 4,885,911, Dec. 12, 1989, and U.S. Pat. No. 4,918,923, Apr. 24, 1990, both by Woollenweber, et al. A prior art turbocooler is shown in FIG. 1.

The success of turbine-driven cooling systems is dependent upon the quantity and availability of exhaust gas energy. At high engine speed and load, there is an abundance of exhaust gas energy, so much that in some instances it becomes necessary to incorporate a waste gate in the exhaust system.

However, the amount of exhaust gas energy decreases as engine speed is reduced, and at low idle speeds where exhaust temperature is low and exhaust gas flow is minimal, the exhaust gas energy level is frequently inadequate to provide an acceptable flow of cooling air from a turbine driven fan. If there is a demand for an appreciable amount of cooling air flow at low idle speed, such as that needed for an air-conditioning condenser or heat exchangers for auxiliary hydraulic equipment, a turbine-driven fan system might not be capable of meeting the demand.

SUMMARY OF THE INVENTION

The invention provides an internal combustion engine cooling system with a motor-assisted turbofan. In the invention, the deficiency in exhaust gas energy at low idle and low engine speeds is supplemented by energy from an outside power source such as a battery or a vehicle electrical system. The turbine-driven fan is increased in rotational speed by energizing the motor attached to the turbine fan shaft from the outside power source. When a cooling air quantity larger than the turbofan can supply using exhaust gas energy is required, the motor-assist is energized by a suitable control means and causes the turbofan to speed up to a level necessary to satisfy the cooling air flow requirement.

A cooling air system of the invention includes a ducted fan for supplying cooling air to one or more heat exchangers of an internal combustion engine system, a turbine driven by exhaust gas of the internal combustion engine system and connected to rotate the ducted fan from energy of the engine exhaust, an electric motor driven from electrical energy derived from a battery or from the internal combustion engine electrical system and connected to rotate the ducted fan, and a control for applying the electrical energy to the electric motor when the exhaust gas energy is insufficient to provide an acceptable flow of cooling air for the heat exchangers. Such a control can include an engine speed sensor for providing a motor operating signal, or a flow sensor downstream of the heat exchangers for providing a motor operating signal, or temperature sensors located at various places in the cooling circuits for providing a motor operating signal, or any other suitable sensor.

The invention also provides a motor-assisted turbofan assembly. Motor-assisted turbofan assemblies of the invention include a combined motor-turbine driving section and a ducted fan section, both sharing a common rotating shaft having a first end and a second end and a central portion carried by shaft bearings. The combined motor-turbine section comprises a plurality of turbine blades at the first end of the rotating shaft, and an exhaust gas volute for directing exhaust gas from a turbine inlet through the plurality of turbine blades to rotate said shaft, and the ducted fan section comprises a plurality of fan blades at the second end of the rotating shaft, and a cooling air duct encompassing the fan blades, with the cooling air duct having an inlet around the central portion of the rotating shaft and an outlet adjacent the second end of the rotating shaft. The combined motor-turbine section further comprises an electric motor with a plurality of magnets mounted on the central portion of said rotating shaft and a plurality of motor windings mounted in the housing surrounding the magnets. In preferred embodiments of the invention, the motor windings are in heat transfer relationship with the cooling air duct. In the preferred embodiments of the invention, the cooling air duct is connected to a bearing housing, carries the plurality of motor windings and has an interior opening adjacent the plurality of motor windings and upstream of the fan blades. The bearing housing has an air inlet and provides an air passageway to the interior opening of said duct so that rotation of the shaft and fan blades provide air flow through the assembly for cooling the shaft bearings and motor windings.

The invention provides a cooling method for use with an internal combustion engine system by converting exhaust gas energy of an internal combustion engine to rotational energy for rotating a fan, producing a flow of cooling air for the internal combustion engine system with the fan, converting electrical energy from the system to rotational energy for rotating the fan upon demand, and generating a demand signal for initiating and terminating the conversion of electrical energy to rotational energy for rotating the fan upon unacceptable cooling in the system.

Further features and advantages of the invention will be apparent from the drawings and more detailed description of the invention that follows.

DETAILED DESCRIPTION OF THE DRAWINGS

DETAILED DESCRIPTION OF THE INVENTION

Figure 2:
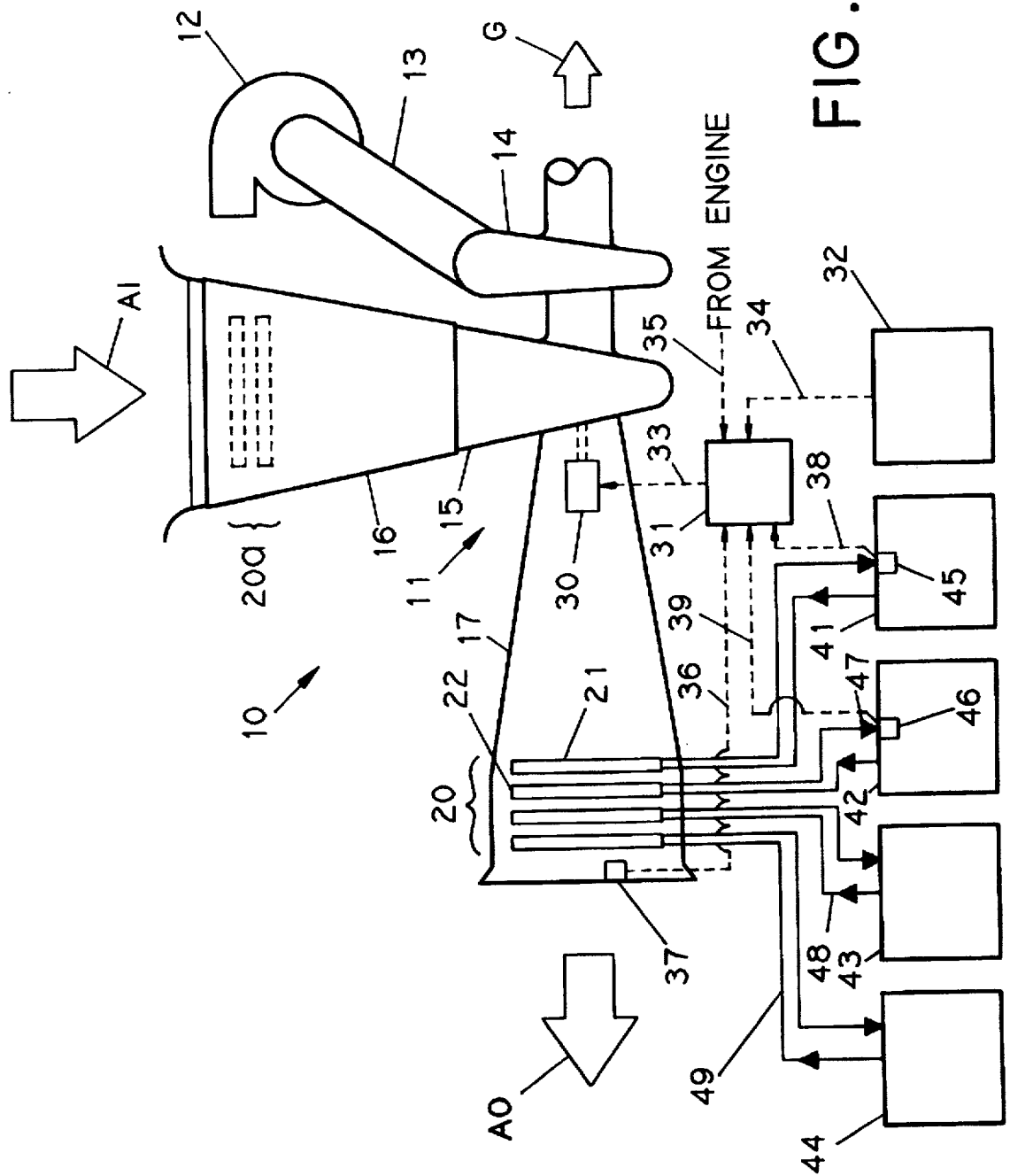
FIG. 2 is a drawing of a turbo-cooling system of the invention.

FIG. 2 is a diagrammatic showing of a cooling system 10 of the invention. As shown in FIG. 2, a turbofan assembly 11 is connected with the output of a turbocharger 12 of an internal combustion engine system (not shown). The turbocharger 12 receives the exhaust gas of the internal combustion engine to generate an increased flow of charge air for the cylinders of the internal combustion engine in a matter well known in the art. The exhaust gas outlet of the turbocharger 12 is connected through a duct 13 to an input volute 14 of the turbofan assembly 11. As described in greater detail below, the energy of the engine exhaust gas drives a plurality of turbine blades within the turbofan assembly 11 before it is discharged from the turbofan assembly, as indicated by the arrow "G". The turbine blades of a turbofan assembly 11 are mounted on a common rotating shaft with a plurality of fan blades in communication with a fan inlet 15. The rotating fan blades of the turbofan assembly 11 draw air into the inlet duct 16 as indicated by the arrow "AI", and the air is drawn through the fan blades and urged outwardly through the diffuser 17 and through one or more heat exchangers indicated collectively by the number "20" within the diffuser 17 before being expelled as indicated by the arrow "AO". While the heat exchangers 20a are shown in the diffuser outlet of the turbo-cooling system 10 in FIG. 2, any one or all of the heat exchangers 20 may be located in the inlet duct 16 of the turbo-cooling system 10 as indicated in dashed lines 20a of FIG. 2, or, of course, heat exchangers may be located in both the inlet duct 16 and the outlet diffuser 17 of the turbo-cooling system 11.

In accordance with the invention, the turbofan assembly 11 may be assisted by an electric motor 30, shown in dashed lines in FIG. 2 operated by a control 31 from energy derived from a source of electrical energy 32, such as the battery or electrical system of the internal combustion engine, or from a separate auxiliary electrical energy source. The electrical motor 30 is connected to the rotating shaft of the turbofan assembly 11 for providing rotating energy to the turbofan assembly from the electrical system 32 in response to operating signals from the control 31. The control 31 may generate motor operating signals from one or more of a number of operating conditions of the turbo-cooling system 10.

Most generally, the control 31 applies electrical energy from the electrical source 32 to the motor 30 when the exhaust gas energy of the internal combustion engine is insufficient to provide an acceptable flow of cooling air for the heat exchangers. Control 31 may receive signals from one or more sensors for operating conditions of the internal combustion engine system, such as engine speed, over a connection 35 to, for example, operate the motor 30 when the internal combustion engine is operating at idle or low speeds where its exhaust gas energy is low and may not provide an acceptable rotating speed for the turbofan assembly 11. In addition, or in place of engine sensors, the turbo-cooling system 10 may be provided with a sensor 37 downstream of the heat exchanger or heat exchangers 20 to provide a signal over connection 36 to indicate an insufficient air flow through the heat exchangers. In place of, or in addition to such sensors, the control 31 may be provided with signals from temperature sensors located at various locations in the internal combustion engine system or turbo-cooling system to indicate when there is insufficient cooling taking place in the one or more systems being cooled by the turbo-cooling system 10.

FIG. 2 indicates diagrammatically a plurality of sources of working fluids to be cooled by the turbo-cooling system 10. Although FIG. 2 includes four sources 41–44, turbo-cooling systems of the invention can be, for example, used to cool one, or any greater number of systems that need to be cooled. The sources 41–44 can be, for example, any of the following: engine coolant, charge air coolant, hydraulic oil from any hydraulic system of equipment auxiliary to the internal combustion engine, engine lube oil, air-conditioning refrigerant, and other such working fluids from operating systems that may need to be cooled in the internal combustion engine system. In the turbo-cooling system 10, the control 31 can be provided with temperature sensors located at various locations that may indicate the need of further cooling. For example, assuming that source 41 represents the hydraulic system used to operate one of the hydraulic tools commonly employed in off-road systems operated by internal combustion engines, the hydraulic oil system may be provided with a temperature sensor 45 for the hydraulic oil being returned to the system from heat exchanger 21. The output of such a sensor can be delivered to the control 31 over connection 38. In another example, if source 42 represents a source of engine coolant, a temperature sensor 46 can be provided in the conduit 47 returning coolant from the heat exchanger 22, and the sensor 46 can provide a signal over connection 39 to the control 31. Of course, the conduits 48 and 49 that return fluids to sources 43 and 44 may also include temperature sensors connected with control 31. If control 31 is a microprocessor controller, it can be provided with look-up tables or other criteria permitting it to interpret the signals from the one or more sensors connected to it and provide operating electrical energy from the source 32 to the motor 30 when it is needed by the system.

In FIG. 2, fluid connections are indicated by solid lines and electrical connections are indicated by dashed lines.

Figure 1:
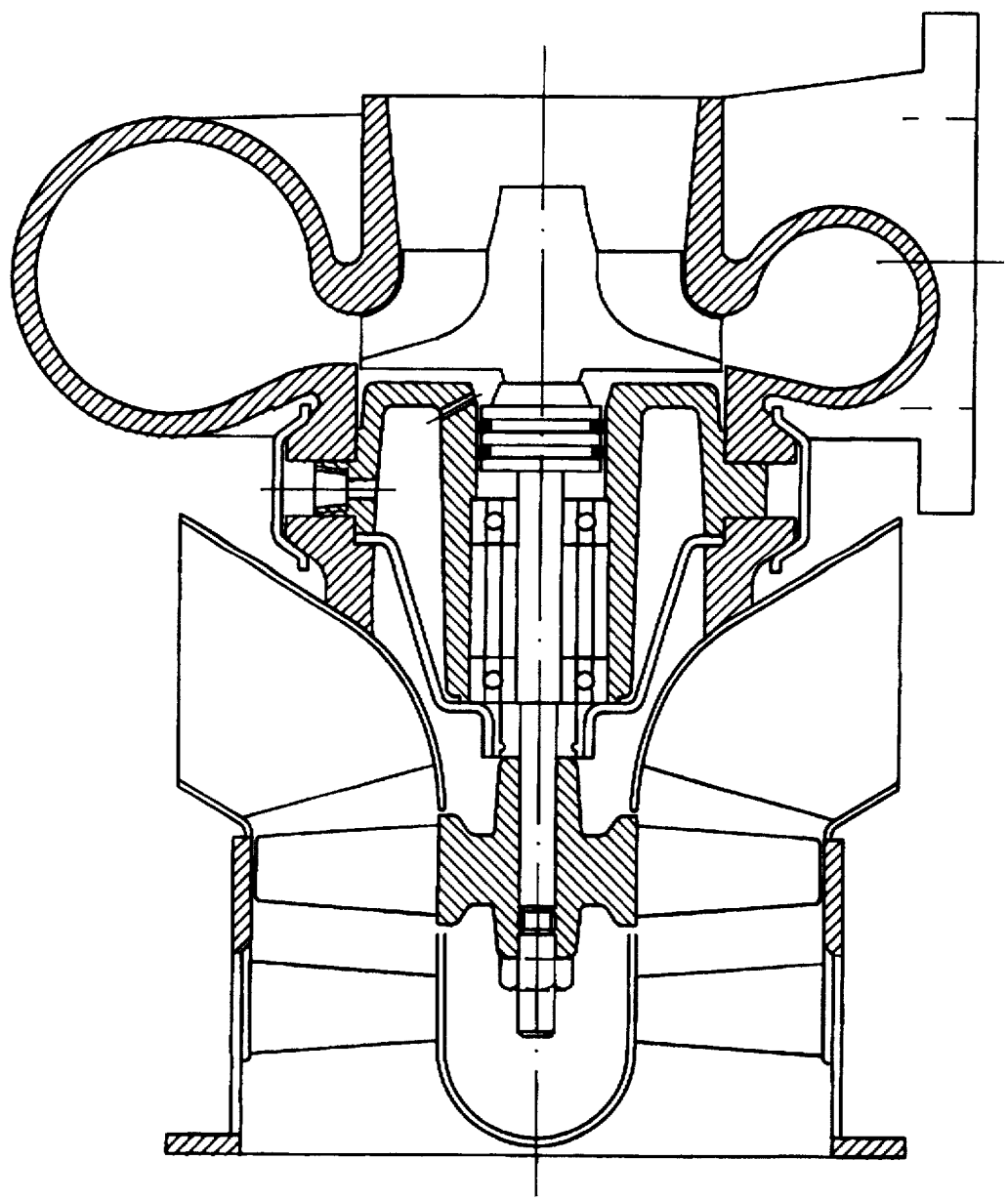
FIG. 1 is a cross-sectional view of a prior art turbofan assembly taken at a plane through the center of its rotating axis.
Figure 3:
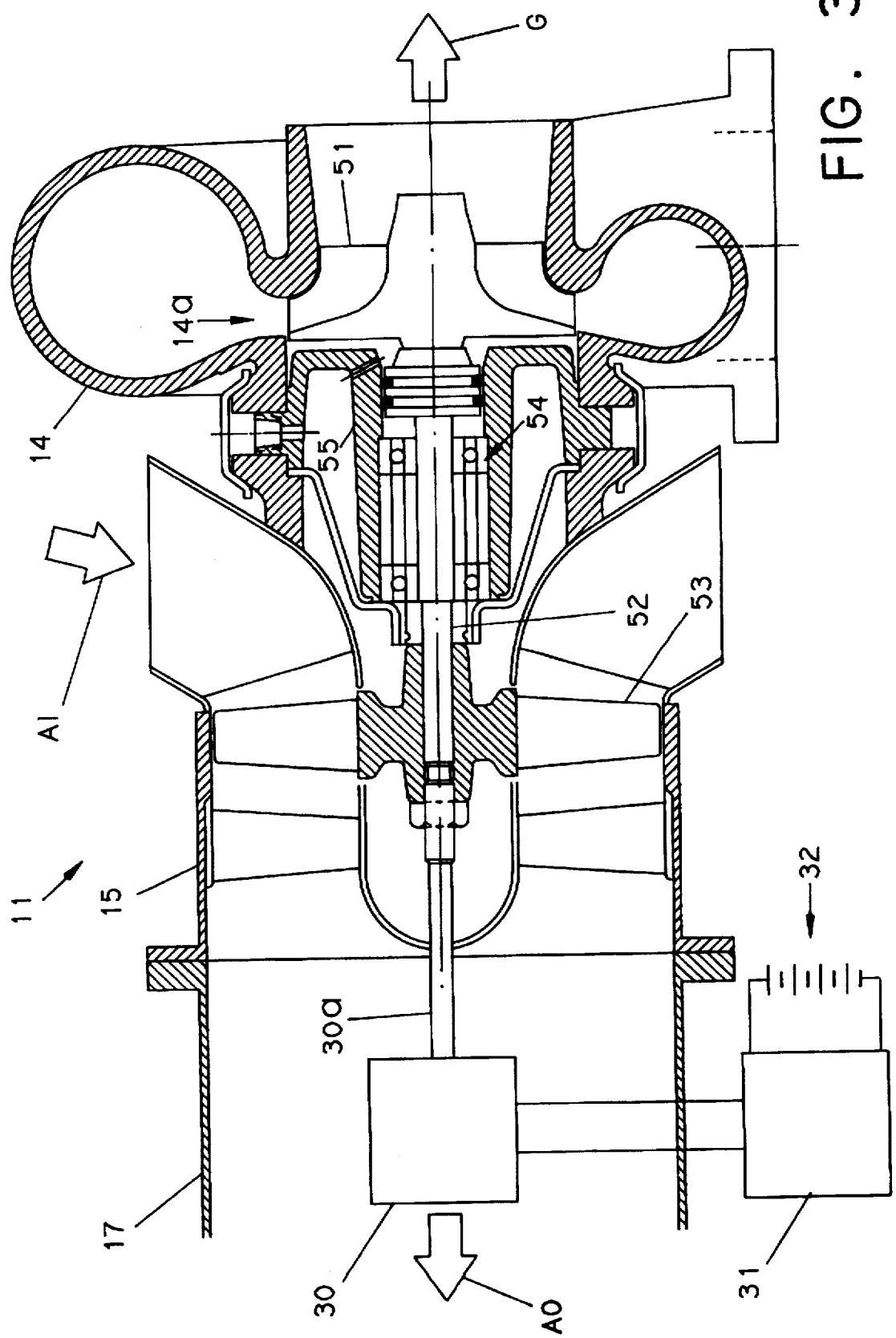
FIG. 3 is a diagrammatic and partially cross-sectional view of the motor-assisted turbo-fan assembly of FIG. 2.

FIG. 3 is a cross-sectional view of the turbofan assembly 11 of FIG. 2. The turbofan assembly 11 is the same as the turbofan assembly of the prior art as depicted in FIG. 1, except for the motor 30 whose motor shaft 30a is connected to the rotating shaft of the turbofan assembly 11. As illustrated in FIG. 3, the motor 30 is preferably connected across the battery 32 of the internal combustion engine for its electrical power source 32.

As shown in FIG. 3, the turbofan 11 comprises, as known in the art, a plurality of turbine blades 51 at one end of a rotating shaft 52, which carries a plurality of fan blades 53 at its second end. The central portion of the rotating shaft 52 is carried by a bearing assembly 54, which is carried by stationary bearing housing 55. The plurality of fan blades 53 are encompassed by an air duct 15.

In operation, exhaust gas is directed from the volute 14 through a turbine inlet opening 14a which directs it through the plurality of turbine blades 51 where energy is absorbed from the exhaust gas stream and converted to rotational energy for driving the rotating shaft 52 and fan blades 53. Rotation of the fan blades 53 draws air AI into the air duct 15 which is urged outwardly of the turbofan assembly 11 through the diffuser 17 and around the electric motor 30 as a cooling air flow A0. It can be appreciated the application of electrical energy to the motor 30 can rotate the plurality of fan blades 51 in the event the energy of the exhaust gas is insufficient to acceptably rotate the plurality of turbine blades 51. Operation of the turbofan assembly 11 urges air through the inlet duct 15 and diffuser 17 and around the electric motor to carry away energy lost in electric motor as heat.

The invention thus provides a method of generating a flow of cooling air for an internal combustion engine system by converting the exhaust gas energy of an internal combustion engine to rotational energy for rotating a fan that produces a flow of cooling air for cooling working fluids of the internal combustion engine system, and upon demand, by converting electrical energy to rotational energy for the fan and generating demand signals from conditions in the internal combustion engine system indicating unacceptable cooling, such as low engine operating speeds, excessive temperatures in the system, inadequate cooling air flow and the like.

More particularly, the method of the invention generates a flow of cooling air for one or more heat exchangers 20 for working fluids 41-44 of the internal combustion engine system from energy derived from the internal combustion engine system by directing exhaust gas from the internal combustion engine to a turbine 51 of a turbine-fan assembly 11 and operating the fan 53 from energy derived from the engine exhaust gas by the turbine to produce the cooling air flow for the heat exchangers 20, and sensing one or more conditions in the system 10 indicating an inadequate flow of cooling air and thereupon operating the fan with an electric motor 30 from electrical energy 32 available in the system to drive the fan 53 supplementing the operation of the fan 53 by the turbine 51 from the engine exhaust gas.

Figure 4:
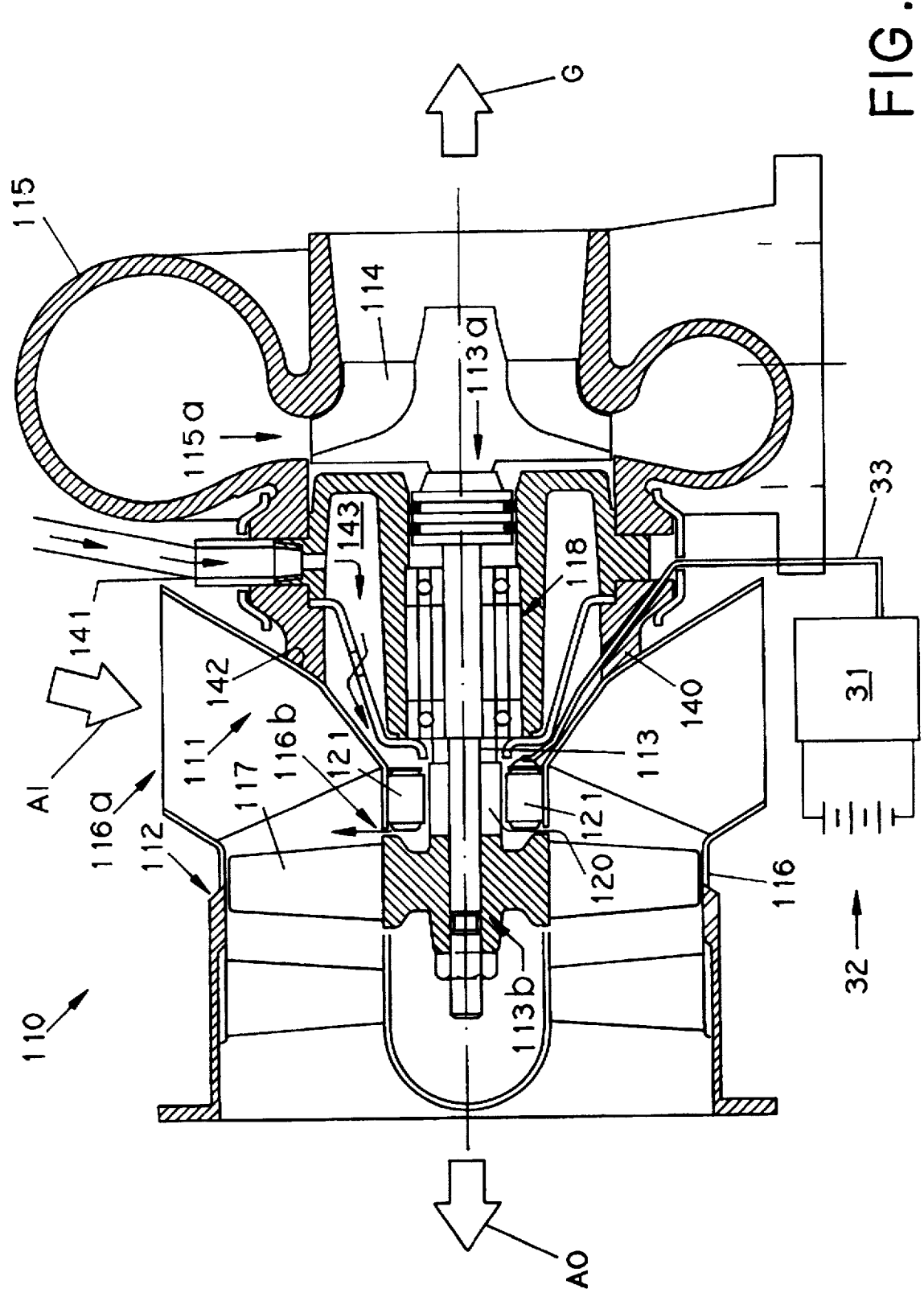
FIG. 4 is a cross-sectional view of a preferred motor-assisted turbofan assembly of the invention.

The invention also provides a motor-assisted turbofan assembly 110, as shown in FIG. 4, which can be used to replace turbofan assembly 11 and motor 30 of the cooling system of FIGS. 2 and 3. The turbofan assembly 110 comprises a combined motor-turbine driving section 111 and a ducted fan section 112 sharing a common rotating shaft 113. The first end 113a of the rotating shaft 113 carries a plurality of turbine blades 114, and the second end of the rotating shaft 113b carries a plurality of fan blades 117. The combined motor-turbine section 111 includes an exhaust gas volute 115 directing engine exhaust gas through a turbine inlet opening 115a and through the plurality of turbine blades 114 to rotate the shaft 113. The ducted fan section 112 includes an air duct 116 encompassing the plurality of fan blades 117 and providing an air inlet 116a. As shown in FIG. 3 and the preferable motor-assisted turbofan assemblies of FIG. 4, the cooling air duct 116 and its inlet 116a are arranged around the central portion of the rotating shaft 113 between the turbine blades 114 and fan blades 117. The central portion of the rotating shaft 113 is carried by a bearing assembly 118, which is in turn carried by a bearing housing 140.

In the invention, the combined motor-turbine section is provided with a plurality of magnets 120 mounted on the central portion of the rotating shaft 113, and a plurality of motor windings 121 are located adjacent the magnets as shown in FIG. 4, and connected to the control means 31 through electrical conduits 33. As indicated above, electrical power from source 32 is controlled by control means 31 and applied over the electrical motor conduits 33 to the plurality of motor windings 121. The interaction of the electrical energy applied to the motor windings 121 and the magnets 120, which are fastened to the rotating shaft 113, converts electrical energy from the power source 32 into rotational energy to drive the plurality of fan blades 117. As shown in FIG. 4, in preferred motor-assisted turbofan assemblies 110, the motor windings 121 are carried in the assembly in heat transfer relationship with cooling air duct 116, which acts as a heat sink conducting the heat generated by electrical losses of the motor windings 121 to the cooling air duct 116 which is, of course, cooled by the cooling air urged through the duct 116 by the rotating fan blades 117.

Further cooling for the motor-assisted turbofan assembly 110 can be provided by a substantially air-tight connection 142 of the cooling air duct 116 to the bearing housing 140, and providing a passageway for cooling air adjacent the bearing assembly 118 and motor windings 121. The bearing housing 140 is joined to the air duct 116 in a substantially air-tight joint 142 and the bearing housing 140 is provided with an air opening 141 connectable with ambient air from the engine air cleaner (not shown). The cooling air duct 116 is provided with an interior opening 116b adjacent the plurality of motor windings 121 and upstream of the rotating fan blades 117. As so constructed, the preferred motor-assisted turbofan assembly 110 of the invention forms a air passageway 143 and rotation of the fan blades 117 draws air into the air opening 141 of the bearing housing 140 through the passageway 143 around the motor windings 121 and outwardly through the interior opening 116b of the cooling air duct. In its transit through the bearing housing and around the motor windings 121, the flowing air provides cooling for the bearings 118 and motor windings 121 of the assembly 110.

Thus, with the invention, any deficiency in the exhaust gas energy at low idle or low engine speeds can be supplemented from energy from the electrical power source 32 and an acceptable speed of rotation and cooling air flow from the fan blades can be maintained in the turbofan cooling system.

While the invention has been described with respect to currently known preferred embodiments and best mode of operation, those skilled in the art will recognize that other embodiments and methods of operation are possible without departing from the scope of the invention as defined by the following claims and prior art.

We claim:

1. A motor-assisted turbofan assembly to be driven by exhaust gas from an internal combustion engine, comprising a combined motor-turbine driving section and a ducted fan section sharing a common rotating shaft having a first end and a second end and a central portion carried by shaft bearings, said combined motor-turbine section comprising a plurality of turbine blades at said first end of said rotating shaft, an exhaust gas volute for directing exhaust gas from an inlet through said plurality of turbine blades to rotate said shaft, said ducted fan section comprising a plurality of fan blades at said second end of said rotating shaft, a cooling air duct encompassing said fan blades, said cooling air duct having an inlet around said central portion of said rotating shaft and an outlet adjacent said second end of said rotating shaft, said combined motor-turbine section further comprising an electric motor with a plurality of magnets mounted on the central portion of said rotating shaft and a plurality of motor windings located around the periphery of the magnets.

2. The motor-assisted turbofan assembly of claim 1 wherein said motor windings are in heat transfer relationship with said cooling air duct.

3. The assembly of claim 1 wherein said cooling air duct is connected to a bearing housing, said cooling air duct carrying said plurality of motor windings and having an interior opening adjacent said plurality of motor windings and upstream of said fan blades, said bearing housing having an air inlet and providing an air passageway to said interior opening of said duct so rotation of said shaft and fan blades induces air flow through said assembly for cooling said shaft bearings and motor windings.

4. The assembly of claim 1 further comprising a motor control connected with said plurality of motor windings to energize said motor windings and rotate said rotating shaft.

5. The assembly of claim 4 further comprising a speed sensor of an internal combustion engine providing an electric motor operating signal when said internal combustion engine operation provides insufficient exhaust gas energy for providing an acceptable flow of cooling air with said fan blade rotation.

6. The assembly of claim 1 further comprising at least one heat exchanger in communication with said cooling air duct.

7. The assembly of claim 6 wherein said heat exchanger is upstream of said fan blades.

8. The assembly of claim 6 wherein of said heat exchanger is downstream of said fan blades.

9. The motor-assisted turbofan assembly of claim 1 further comprising one or more heat exchangers of said internal combustion engine system in communication with the cooling air duct, a control for applying electrical energy to said electric motor.

10. The cooling air system of claim 9 wherein said control includes an air flow sensor downstream of said heat exchangers for providing a motor operating signal.

11. The system of claim 9 wherein said control includes an engine speed sensor for providing a motor operating signal.

12. The system of claim 9 wherein said control includes a sensor for exhaust gas pressure for providing a motor operating signal.

13. The system of claim 9 wherein said control includes temperature sensors for providing motor operating signals.

* * * * *